March 25, 1969     E. HENCKEL ET AL     3,435,077
PROCESS FOR THE PRODUCTION OF ASYMMETRICAL FORMALS
Filed Jan. 12, 1966

INVENTOR
EKKEHARD HENCKEL
HANS VON PORTATIUS

BY *I. William Miller*

ATTORNEY

United States Patent Office 3,435,077
Patented Mar. 25, 1969

3,435,077
PROCESS FOR THE PRODUCTION OF ASYMMETRICAL FORMALS
Ekkehard Henckel and Hans Von Portatius, Marl, Germany, assignors to Chemische Werke Huls A.G., Marl, Germany
Filed Jan. 12, 1966, Ser. No. 520,155
Claims priority, application Germany, Jan. 16, 1965,
C 34,873
Int. Cl. C07c 41/10, 41/00, 41/02
U.S. Cl. 260—611    12 Claims This invention relates in general to the production of asymmetrical formals and more specifically to a process of producing the same from epoxides and hemiacetals.

Asymmetrical formals have not heretofore been produced from hemiacetals especially from hemiacetals of formaldehyde since they are unstable compounds existing only in equilibrium with their precursors. Hemiformals have been detected and identified in various reactions as intermediates, for example, in the formation of formals from alcohol and formaldehyde. However, the hemiformals have not heretofore been isolated since the reaction of alcohols and formaldehyde, in the presence of acidic catalysts proceeds directly to the formals. Thus, when the hemiformals are in equilibrium with their precursors i.e. alcohol and formaldehyde in an acid medium, the dissociated free alcohol condenses with the hydroxyl group of the residual hemiformal and free formaldehyde is liberated. In the event the acidic medium is hydrochloric acid, the dissociated chlorine ion reacts with the hemiformal to produce an intermediate product chloromethyl-alkyl ether R—O—CH$_2$—Cl which then reacts with free alcohol. Further, the acid reaction mass must also be neutralized with at least equivalent amounts of base (in most cases pyridine or dimethyl aniline) which makes the process more expensive. Moreover, the asymmetrical formal yield from this process is somewhat low.

According to U.S. Patent No. 2,838,573, asymmetrical formals can be produced by acid-catalyzed "reformalization" of a symmetrical formal with triethylene glycol. In this process, half of the bound alcohol in the formal is cleaved therefrom and must be removed by distillation. Also, there are particularly high losses of the reactants, in this reaction, which results in lower yields.

It is also possible, according to U.S. Patent 2,340,907 to obtain polyethers of the formula

R—O—CH$_2$—O—CH$_2$—CH$_2$—OH by the acid-catalyzed reaction of 1,3-dioxolane with an alcohol ROH. However, the 1,3-dioxolane employed in this process is quite expensive, and the product yields therefrom are also somewhat low. Also in U.S. Patent 2,497,315, liquid polymers are obtained by the reaction of 1,3-dioxolane with alcohols in the presence of mineral acids. However, the resulting liquid polymers do not conform to the type sought herein inasmuch as they contain alternatingly glycol ether and formal groupings.

All of the above-described methods of producing asymmetrical formals are exceedingly cumbersome and expensive, and very often result in poor yields. Thus, there exists a need for a direct and economical process of directly synthesizing asymmetrical formals.

It is therefore a principal object of this invention to provide an improved process of producing asymmetrical acetals directly from hemiacetals.

It is another object of this invention to provide an improved process of producing stable hemiacetals from which asymmetrical acetals are produced.

It is still another object of this invention to provide an improved process of producing long chain polyethers by hydroxyethylating asymmetrical hemiformals.

It is yet another object of this invention to provide an improved process of producing asymmetrical formals directly from alcohols, formaldehyde and epoxides.

These and other objects and advantages of the invention will become apparent hereinafter from the description, claims and drawings appended hereto.

Surprisingly, it has been discovered that asymmetrical formals are produced in very high yields by reacting hemiformals with epoxides in the presence of electrophilic catalysts at temperatures between 0 and 120° C. In this process it has advantageously been found that neither monomeric nor polymeric formaldehyde is liberated in free form to reduce the yields.

The asymmetrical formals of the present invention have the structure:

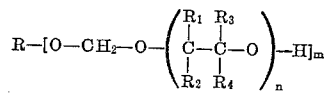

wherein

R is an alkyl, alicyclic, aliphatic which is not alkyl or an aryl residue,
R$_1$ is hydrogen or an alkyl, alicyclic, aliphatic which is not alkyl or an aryl residue or together with R$_3$ a member of a cyclic residue,
R$_2$ is hydrogen or an alkyl or an aliphatic which is not alkyl residue,
R$_3$ is hydrogen or a lower alkyl or a lower aliphatic which is not alkyl residue or together with R$_1$ a member of a cyclic residue,
R$_4$ is hydrogen,
$n$ is an integer of 1 to 40, preferably 1 to 20, and more preferably 1 to 12, and
$m$ is an integer of 1 to 100, preferably 1 to 10, and more preferably 1 to 4.

Referring now to the process flow scheme and associated process equipment utilized therein:

Figure 1:
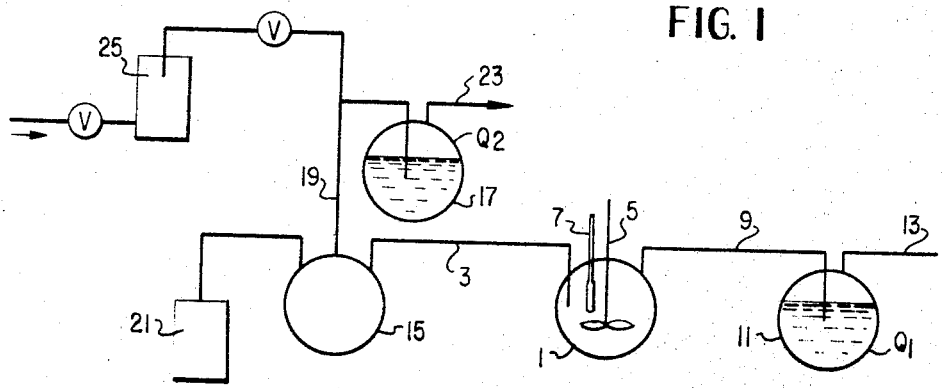
FIGURE 1 is a schematic diagram of the process used in the production of hemiformals.

These figures will be described in greater detail in Examples A and B herein.

Suitable hemiformals R–(O·CH$_2$·O·H)$_m$ can be obtained in accordance with a novel aspect of the invention wherein formaldehyde is reacted with an alcohol containing primary, secondary, or tertiary hydroxyl or phenolic hydroxyl groups and having the formula:

R·(OH)$_m$ wherein R is an m-valent alcohol residue being preferably but not limited to:

(A) Alkyl having 1 to 200, preferably 1 to 25 carbon atoms which are straight or branched chain;
(B) Alicyclic having 4 to 20, preferably 5 to 12 carbon atoms in the ring and 0 to 5 side chains attached thereto having 1 to 18, preferably 1 to 12 carbon atoms;
(C) Aliphatic which is not alkyl and having 3 to 40, preferably 3 to 20 carbon atoms which are straight or branched chain and contain 1 to 10, preferably 1 to 4 double or triple bonds and having 0 to 20, more preferably 0 to 10 oxygen atoms interposed in the chain.
(D) Aryl having 1 to 3, preferably 1 to 2 rings, said aryl being preferably hydrocarbon aryl;
(E) Aralkyl having in the alkyl 1 to 20, preferably 1 to 14 carbon atoms, and an aryl portion, preferably hydrocarbon aryl, having 1 to 3, preferably 1 to 2 rings, (F) Substitution products of (A), (B), (C), (D) or (E) wherein the substituted moiety can be an ester, halogen, ether, acetal, or nitrile groups, and $m$ is an integer of preferably 1 to 100, more preferably 1 to 10, and most preferably 1 to 4.

Since the above reaction can also be conducted with polymeric compounds which carry one or more hydroxyl groups, $m$ is dependent both upon the number of such hydroxyl groups and upon the degree of polymerization and the molecular weight of the alcohol. Consequently, to set a specific upper limit for $m$ would be arbitrary—suffice it to say that $m$ can be very high.

Particularly suitable are the hemiformals of the following alcohols: methanol, ethanol, n-propanol, n-butanol, isobutyl alcohol, n-amyl alcohol, isoamyl alcohol, n-hexyl alcohol, n-heptanol, n-octyl alcohol, n-decyl alcohol, lauryl alcohol, myristyl alcohol, cetyl alcohol, stearyl alcohol, benzyl alcohol, cyclohexanol, diethylene glycol monoethylether, triethylene glycol monoethylether, triethylene glycol monobutylether, 1,2-propyleneglycol-1-n-butylether, ethylene glycol monomethylether, isopropanol, sec. butyl alcohol, sec. amyl alcohol, 6-ethyl-decanol-(3), 5 - ethyl-heptanol - (2), 5-ethyl-nomanol-(2), 6-ethyl-octanol-(3), tert. butanol, and technical mixtures, such as sec.-n-$C_{14}$ alcohol mixture and a mixture of n-prim.-$C_{10}$-$C_{18}$ alcohols.

The above generically and specifically described alcohols can be reacted directly with formaldehyde to obtain the corresponding hemiformals, without incurring any other change in the remainder of the molecule. Suitable alcohols are, for example, allyl alcohol, proparagyl alcohol, endomethylene-tetrahydrobenzyl alcohol, ethylene chlorohydrin, 2-ethyl-3-hydroxy-hexanol, ethylene glycol monoacrylate, propylene glycol monoacrylate, and propylene glycol monomethacrylate.

Other suitable polyvalent alcohols are, for example glycol, propylene glycol - (1,2), propylene glycol - (1,3), butanediol-(1,4), pentanediol-(1,5), 1,4-butenediol, 2,2-dimethyl propanediol-(1,3), hexanediol-(1,6), decanediol-(1,10), diethylene glycol, triethylene glycol, thiodiglycol, hexadiene - (2,4)-diol-(1,6), and other diols having a double or triple bond in the carbon chain, and also glycerin, hexanetriol, dioxyacetone, and pentaerythritol.

Also suitable are phenols, such as for example, the monohydric phenols, such as phenol, o-cresol, m-cresol, p-cresol, o-, m-, p-chlorophenol, p-bromphenol, o-, m-, and p-nitrophenol, 2,4-dinitrophenol, guaiacol, eugenol, salignenin, o-oxyacetophenone, p-oxyacetophenone, and o-cyclohexyl phenol.

The hemiformals to be employed can be readily obtained from the above-described alcohols of the formula $R(OH)_m$ and pure formaldehyde according to the present invention by introducing the formaldehyde and alcohol slowly into a cooled reaction vessel at a controlled rate and, if desired, in the presence of an inert solvent, such that the reaction temperature is maintained at at least 20° C., preferably 50–170° C., above the boiling point of the pure formaldehyde i.e. −21° C. It is also desirable that the concentration of free formaldehyde present in the reaction mass is maintained no higher than about 8%, preferably 5% by weight. This reaction can be conducted with or without an acidic or basic catalyst. When the reactivity of the alcohol is high, lower reaction temperatures may be used, and conversely when the reactivity of the alcohol is low, higher reaction temperatures can be used depending upon the thermal stability of the produced hemiacetal.

The hemiacetals formed from formaldehyde must be free of water and any other impurity therein which is reactive with epoxides. Therefore, these hemiacetals are preferably produced in a separate step by introducing pure, monomeric formaldehyde into pure alcohol—i.e., without a solvent and catalyst—thereby obtaining the hemiacetals in substantially pure form. In the event a solvent is employed, it must be inert with respect to the hemiformals as well as epoxides which are to be later added. Solvents suitable herein are hydrocarbons, such as butane, pentane, hexane, heptane, etc.; benzene, toluene, xylenes, single or mixed aliphatic, cycloaliphatic, and aromatic ethers, such as anisol or phenetol. Esters are also suitable as solvents and include halogenated hydrocarbons, such as $CCl_4$, $CHCl_3$, $C_6H_5Cl$, $C_2Cl_6$, etc. Likewise usable are mixtures of the foregoing solvents which are inert with respect to hemiformals and epoxides. If desired, the solvent can also be separated from the hemiformal under vacuum without splitting off the formaldehyde from the hemiformal containing the same.

The epoxides which can suitably be reacted with the hemiformals have the following formula:

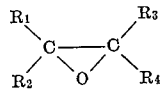

wherein $R_1$, $R_2$, $R_3$, and $R_4$ have the same meanings as above for the asymmetrical formals, with the provision that they are always monovalent. In the alternative, $R_1$ to $R_4$ can be hydrogen atoms; preferably 3 of the R's are hydrogen, when the remaining R is a substituted or non-substituted alkyl residue. Also $R_1$ and $R_3$ can be joined by a carbon-carbon bond to form cyclic compounds such as cyclohexenoxide, cyclooctenoxide cyclopentenoxide.

Suitable epoxides are, for example, ethylene oxide, propylene oxide, cyclohexene oxide, epichlorohydrin, cyclopentene oxide, cyclooctene oxide, glycidyl alkylether, glycidyl acetate, isobutene oxide, 1 (or 2)-butene oxide, trimethyl ethylene oxide, tetramethyl ethylene oxide, butadiene monoxide, styrene oxide, α-methyl styrene oxide, 1,1-diphenyl ethylene oxide, epifluorohydrin, epibromohydrin, hexyl glycidyl ether, glycidyl methacrylate, 2-chloroethyl glycidyl ether, vinyl cyclohexene monoxide, epoxy sulfolane, 4-5-epoxydecadiene-(1,9), 1,2-tetradecanol epoxide, pheneyl glycidyl ether, o-chlorophenyl glycidyl ether, p-chlorophenyl glycidyl ether, hexyl glycidyl ether, allyl glycidyl ether, cis-butene-2-oxide, trans-butene-2-oxide, p-nitrostyrene oxide, 1,1,1-trifluoro-2-propylene oxide, 1,1,1-trifluoro-2-methyl-2-propylene oxide, 1,1,1-trifluoro-2-isopentene oxide, β,β-dimethyl glycidic acid nitrile, dimethyl glycidic acid ethyl ester, 1-isopropyl,1,-diethylethylene oxide, 1-isopropyl-1, methyl-ethylene oxide, 1,2-dimethyl-1-ethyl-ethylene oxide, 1-methyl-1-ethyl-ethylene oxide, sym. diphenylethylene oxide, cyclohexyl-ethylene oxide, n-octyl-ethylene oxide, 1,2-dioctyl-ethylene oxide, n-dodecyl-ethylene oxide, and cyclooctene oxide, as well as butylene oxide.

According to the novel process, it is possible to react the hemiformal with stoichiometric amounts of the particular epoxide employed without the formation of undesired by-products. The reaction is conducted in the presence of suitable catalysts.

The catalyst is preferably employed in quantities of 0.0005 to 7.0% by weight, more preferably 0.5 to 5% by weight based on the amount of hemiformals used.

The catalysts found to be reliable are particularly those of the electrophilic type which exhibit the characteristics of known Lewis acids.

Catalysts to be used preferably are boron fluoride, boron fluoride-etherate, tin tetrachloride, titanium tetrachloride, aluminum chloride-etherate, ferric chloride, stannous chloride, zinc chloride, or triphenylmethyl trifluorochloroborate, triphenyl-tin-trifluorochloroborate, etc. Preferably, boron fluoride-etherate or tin tetrachloride are employed as catalysts.

Suitably, the hemiformal is mixed with the catalyst which is added thereto either alone or, if desired, in solution, if required in a batch operation. The catalyst can also be added to the reaction mixture continuously. If a solvent is employed, it must be inert with respect to the hemiformal and epoxide reactants. The same solvents described above as being suitable for the production of the hemiformals are also suitable for use as the reaction medium for the hemiformal and epoxide.

The epoxide must conform with the same requirements as to purity as the hemiformal. If the epoxide has a low boiling point, i.e. below the reaction temperature, it can be used in gaseous form, pure or diluted with inert gases, such as nitrogen, argon, etc. If the epoxide has a high boiling point, i.e. above the reaction temperature, it can be used in liquid or solid form, pure or dissolved in inert solvents.

The hemiformal is reacted with the epoxide under controlled conditions at a temperature between 0 and 120° C., preferably between 20 and 70° C., and particularly between 30 and 50° C. Since the reaction is exothermic, the optimal reaction temperature is attained and controlled by cooling the reaction medium. The selection of the optimum reaction temperature is governed by the stability of the particular hemiformal with respect to the catalyst employed. Also, influencing the choice of reaction temperatures is the susceptibility of the particular epoxide used to dimerization of polymerization under the reaction conditions, i.e., the possible side reactions of the hemiformal with the epoxide.

An increase in temperature, under otherwise identical reaction conditions (type and concentration of the reaction partners, the catalyst, as well as, if desired, type and quantity of the solvent), favors the formation of symmetrical formal from the hemiformal by cleavage of the formaldehyde hydrate, according to the reaction

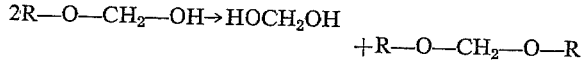

$$2R\text{—}O\text{—}CH_2\text{—}OH \rightarrow HOCH_2OH + R\text{—}O\text{—}CH_2\text{—}O\text{—}R$$

However, this side reaction increases the reaction velocity, i.e., the space-time yield and also results in the formation of symmetrical formals. Not only in the hemiformal consumed during this undesired side reaction, but the formaldehyde hydrate which is produced perforce gives rise to a further side reaction. As in the case of the hemiacetal, the formaldehyde hydrate can also add epoxide to the two attached hydroxyl groups, under the conditions of the reaction, which further reduces the yield. However, it has been found possible to guide the reaction by the selection of suitable conditions, whereby only minimal quantities of by-products are produced.

Similarly, the selection of a particular catalyst and the quantity thereof are dependent upon the hemiformal employed; the epoxide to be reacted therewith; the solvent used; and also upon the concentration of the reactants and the reaction temperature. Since the quantity of by-products formed (symmetrical formal, dimerization of polymerization products of the reactant) increases with the amount of catalyst present, it is preferable to use only a small amount of catalyst. On the other hand, the catalyst must be present in an amount sufficient to attain a minimal reaction velocity. Although the extent of side reactions is partially governed by the reaction velocity, it is preferable to carry out the reaction at a rate of at least 0.1 to 3.5 mols of epoxide per mol of hemiformal consumed per hour.

In the reaction mixture, the catalyst and the hemiformal employed exist in intimate contact and the most favorable reaction conditions are obtained when using the quantities of catalyst disclosed above. It is desirable to select the conditions influencing the reaction such that it takes place as follows:

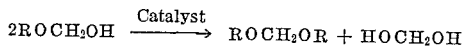

$$2ROCH_2OH \xrightarrow{\text{Catalyst}} ROCH_2OR + HOCH_2OH$$

The extent of this reaction depends, in addition to the other above-described parameters (type reactants, temperature, etc.), predominantly upon the concentration of the hemiformal and the reaction period. Thus, an increase in the rate of reaction accelerates the decrease in the hemiformal concentration, and hence inhibits and reduces the formation of the undesired symmetrical formal.

With the reactants employed herein, the cyclic dimerization of the epoxide is favored by high, perhaps only local, concentrations of the epoxide, in addition to high catalyst concentrations and low reaction temperatures.

Normally, it is therefore desirable to add the epoxide slowly to the reaction mass to avoid the buildup of large concentrations of free, unreacted epoxide. It is also beneficial to constantly stir the reaction mass during the epoxide addition to prevent the buildup of local excess concentrations thereof and still further suppressing the undesired side reactions. In case the epoxide is added more rapidly than it is being reacted, the resulting decrease in temperature signals the end of the (exothermic) reaction.

The epoxide is employed in quantities of 1 to 40, preferably up to 20 mols, more preferably 1 to 12 mols per mol of hemiacetal present. When the epoxide used is capable of polyaddition in the presence of electrophilic catalysts, polyalkoxy chains of practically and desired length can be added thereto. Suitable epoxides for this purpose are, for example, ethylene oxide, propylene oxide, cyclohexene oxide, vinylcyclohexene monoxide, vinyl glycidyl ether, epifluorohydrin, etc.

When the epoxide chosen does not undergo polyaddition reactions in the presence of electrophilic catalysts, the asymmetrical formal having the residue R or the residue of the monomeric epoxide is produced. Such epoxides are, for example, phenylglycidyl ether, o-chlorophenylglycidyl ether, p-chlorophenylglycidyl ether, hexylglycidyl ether, allylglycidyl ether, cis-butene-2-oxide, trans-butene-2-oxide, p-nitrostyrene oxide, α-methylstyrene oxide, 1,1-diphenyl ethyl oxide, 1,1,1-trifluoro-2-pypropylene oxide, 1,1,1-trifluoro-1-methyl-2-propylene oxide, 1,1,1-trifluoro-2-isopentene oxide, β,β-dimethylglycidic acid nitrile, dimethylglycidic acid ethyl ester, 1-isopropyl,1,1-diethyl ethylene oxide, 1-isopropyl-1,methyl ethylene oxide, 1,2-dimetyl-1-ethyl ethylene oxide, 1-methyl-1-ethyl ethylene oxide, sym. diphenyl ethylene oxide, cyclohexyl ethylene oxide, n-octyl ethylene oxide, 1,2-dioctyl ethylene oxide, 1,2-dioctyl-ethylene oxide, n-dodecyl ethylene oxide, and cyclooctene oxide. However, it is also possible, as described hereinafter, to provide these asymmetrical hemiformals with longer polyalkoxy chains in a subsequent reaction step.

Since the acetal and ether groups of the reaction product are not always acid-stable, it is preferable to neutralize the electrophilic catalyst after the reaction is terminated. For this purpose, bases such as, for example, the hydroxides, oxides, or carbonates of the alkali metals and alkaline earth metals are suitable. Also suitable are organic bases, such as amines. The bases are added either in solid form or in a solvent therefor which need not be inert with respect to the hemiformals and epoxides, but should be capable of being easily removable under vacuum. Suitable solvents for the bases are, for example, methanol, acetone, diethyl ether, hexane, in certain cases water, and similar solvents, if the base in question is soluble therein. After adding a predetermined amount of base to neutralize the catalyst, the reaction product is adjusted to a pH of 8; and the solvents which were employed can now be removed. The reaction products are clear liquids, highly viscous oils, and paste-like or crystalline solid materials.

By suitable separation processes, the acidic or alkaline catalysts or their neutralization products can, if desired, be separated. The choice of a particular method will, for the most part, depend upon the properties of the reaction product and the type of catalyst in admixture therewith. Suitable separation and purification processes are, for example, distillation, column chromatography, ion exchange, preparative gas chromatography, liquid-liquid extraction, and recrystallization or reprecipitation. In the majority of cases, however, the small amount of catalyst present in the product will not impair its utility to any serious extent and hence removal of the catalyst from the product is optional.

It is to be understood that the present novel process is not limited only to the addition of epoxide to a catalyst-containing hemiformal. It is also within the contemplation of the invention to reverse the process by mixing the epoxide in liquid form or dissolved in the above-mentioned inert solvents with the catalyst, and then adding the hemiformal thereto. In the alternative, the hemiformal together with the catalyst can be added to the epoxide. Although the foregoing procedure is unsuitable when the epoxide used has a tendency to dimerize or polymerize, it can also be of advantage when the employed epoxide reacts only with the hemiformal and not with itself.

In some cases, it is advantageous to mix the hemiformal with the epoxide before the reaction is initiated and to then either add the catalyst slowly thereto, or else, to add the reactant mixture to a catalyst-containing solvent. In the event the reactants and catalyst are added together slowly, the total amount of catalyst needed for the entire charge of reactants need not be present initially since the remainder of the catalyst can be added at a rate corresponding to the epoxide-hemiformal addition. The important criterion here is that the catalyst concentration is maintained as nearly constant as possible in the reaction medium. If desired, further quantities of epoxide can be added simultaneously with the addition of the catalyst to the reaction mass. This variant of the basic method is particularly suitable when reacting phenol hemiformals with epoxides.

In case the hydroxyl group formed by addition of the asymmetrical formal possesses substantially the same reactivity as the hydroxyl group on the hemiformal, the epoxide present reacts equally with both of these hydroxyl groups. That is to say, a purely 1:1 reaction product cannot be obtained when the hemiformal is stoichiometrically reacted with epoxide; rather, there is obtained a mixture of the hemiformal and long-chain reaction products containing one or more epoxide units. On the other hand, when the hydroxyl group on the formal is reacting very slowly—because of poor reactivity or steric hindrance whereby $R_3$ and $R_4$ are blocked—only a 1:1 adduct can be obtained. Thus, the length of the chain produced by the polyaddition of the epoxide to the hemiacetal is dependent not only upon the quantity of epoxide present in the reaction mass, but also upon the reactivity of the hydroxyl group on the formal under the selected reaction conditions. Accordingly, the index $n$ in the formula set forth above for the asymmetrical formals has a value of 1 to 40, preferably 1 to 20, most preferably 1 to 12.

When a hemiformal is reacted with ethylene oxide, the reactivity of the resulting terminal hydroxyl group on the formal is not very different from the reactivity of the hydroxyl group on the hemiformal. Therefore, the epoxide is reacted with the hydroxy on both the formal and hemiformal in proportion to the reactivity of the hydroxyl group and therefore a purely 1:1 reaction product is not obtainable when using equivalent amounts of these hydroxyl-containing reactants. In other instances only the amount of the charged epoxide governs the chain length of the formal and no end to the epoxide addition can be observed in this reaction.

The present novel process makes it possible, starting with a secondary or tertiary alcohol, via the hemiformal and the epoxide addition reaction, to obtain a product having a primary hydroxyl group which can be hydroxethylated in accordance with conventional methods. If the hydroxethylation is to be conducted with an alkaline catalyst, it is necessary that no free hemiformal groups be present, since they are unstable under these reaction conditions. Moreover, ethylene oxide cannot be added to hemiformal in the presence of a basic catalyst. However, after the chemical addition of about 1.5 or more equivalents of ethylene oxide to the hemiformal in accordance with the novel method (the excess being employed because of the similar reactivity of the OH-group of the formal and the OH-group of the hemiformal), the resulting product can then be hydroxethylated with an alkaline catalyst.

The formal groupings then present having the formula $\equiv C-O-CH_2-O-CH_2-CH_2-OH$, are stable in the presence of alkali even at temperatures in the range of 200° C. and above. Added ethylene oxide then conventionally reacts with the terminal hydroxyl group of the formal at a temperature between 110 and 250° C., preferably between 140 and 200° C., more preferably 150 to 190° C. and in the presence of 0.1 to 2.5% by weight of a strongly basic catalyst. The catalysts which are particularly well suited are sodium hydroxide, potassium hydroxide, sodium, potassium, and similar, strongly basic agents.

In accordance with the previously described embodiments of the novel process, the above-described asymmetrical formals are produced in a manner such that an alcohol and formaldehyde are first converted into a hemiformal which is then mixed with one of the above-mentioned catalysts, and epoxide is chemically added thereto. However, in a combination process, the formation of the hemiformal and the addition of the epoxide thereto can be conducted simultaneously in the same reaction vessel simply by adding formaldehyde and epoxide, at the same time, to the alcohol mixed with the catalyst.

In case the reactivity of the three different types of hydroxyl groups i.e., on the alcohol, the hemiformal, and the symmetrical formal differ substantially, there is obtained a reaction product having the following components: alcohol—formaldehyde—epoxide. The terminal-positioned hydroxyl group on the formal can now react further with either epoxide or formaldehyde, and when formaldehyde is continuously added to or present in the reacting mixture, the resulting polyether will have a chain containing a plurality of ether linkages formed from both formaldehyde and hemiacetals.

If the terminal hydroxyl group formed by the addition of the epoxide will not react with another molecule of epoxide, it will react exclusively with the formaldehyde and the resulting hemiformal group will then react with the epoxide. By providing an excess of a suitable epoxide with respect to the free formaldehyde, whose concentration will always be kept low, there will be obtained a product having an alternating construction of ethers formed from formaldehyde and epoxides.

The compounds produced in accordance with the invention can also be reacted further with the formaldehyde, as above described, to form a hemiformal. In such a case, the resulting hemiformal can be reacted with epoxides in the same manner as the other hemiformals described above. Symmetrical formals produced in this manner have special utility in that the ether linkage formed by the addition of formaldehyde is more easily cleaved by acid than the ether linkages formed by the epoxide addition. Hence, it is possible to incorporate formal groupings into the molecule at predetermined positions on the chain to obtain a product formed from a plurality of staggered ethers, some of which are hydrolyzable in an acidic solution. Compounds having this conformation and a chain formed from ethers derived from both formaldehyde and epoxide can be obtained in accordance with the above-described batch process.

Both of the above methods can be modified whereby the hemiformal reacts simultaneously with the epoxide and the formaldehyde. Additionally, different epoxides can be incorporated, one after the other, into the product molecule by adding the different epoxides to the product. If desired, formaldehyde can be reacted with the product to form the hemiacetal, which is then reacted with another epoxide.

The modifications of the inventive process described hereinbefore for producing asymmetrical formals from hemiformals and epoxides are exemplary only of the flexibility of the basic process.

The asymmetrical formals produced in accordance with the invention are suitable for use as solvents, emulsifiers, detergents, wetting agents, plasticizers, and antistatic agents.

These compounds have a variety of useful properties such as variable solubility, compatibility and viscosity; all of these properties can be predetermined in broad ranges by the kind and molar relations of the reactants.

The properties of the reaction products are dependent essentially upon three different factors:

(1) Firstly, the residue R of the m-valent alcohol $R(OH)_m$ from which the hemiformal is produced plays an important role in determining the properties of the final product. This residue can be selected from a large group of substances as enumerated above and, generally, compounds are suitable containing one or several primary, secondary, or tertiary alcoholic or phenolic OH-groups.

(2) Furthermore, the properties of the reaction product are determined by the type of the epoxide reacted therewith, the epoxide being basically the ethylene oxide which is either unsubstituted or is provided with 1 to 4 substituents. The substituents can be selected from the same group as the residue R of the alcohol on which the hemiformal is based, but they are always monovalent. If desired, two of these residues can be combined to form a ring structure.

(3) Finally, the number of epoxy and formal groupings added or incorporated into the polyether chain influence the nature of the final product as will be illustrated hereinafter.

If the hemiformal is produced from a monovalent, higher alcohol, for example sec.-n-tetradecanol, the R group is hydrophobic and imparts water insolubility to the hemiformal. When ethylene oxide is used as the epoxide for example, the water solubility of the resulting asymmetrical formal is increased by incorporating therein a long-chain polyethylene glycol residue which is strongly hydrophilic. At a medium hydroxethylation degree of 8 to 10, the reaction product is clearly water-soluble but, due to the presence of the large hydrophobic residue, strongly surface-active. There is thus provided a means of varying the properties of the final product within wide limits by selecting the specific starting alcohol, epoxides and molar proportions thereof, to be reacted with the hemiformal. The properties of several classes of the reactants can be combined with one another, to obtain, under certain circumstances, products having novel properties, as demonstrated by the example.

The asymmetrical formals produced by this invention have a wide range of applications. Thus, for example, various of the products, for example reaction products of short-chained hemiformals, such as methanol hemiformal, propanol hemiformal, butanol hemiformal, or isopropanol hemiformal with epoxides are suitable as solvents.

Further, the reaction products of "hydrophobic" hemiformals, such as lauryl alcohol hemiformal, the technical mixture of sec. $C_{14}$ alcohol hemiformals, nonylphenol hemiformal, or cyclododecanol hemiformal, with preferably ethylene oxide, are eminently suitable as auxiliary agents in the textile industry, plasticizers, raw products for detergents, emulsifiers, lubricating oil additives, and antistatic agents.

Furthermore, the properties of conventional products can be altered by means of the novel process. Thus, it is possible, for example, to make dyestuffs water-soluble or water-insoluble, by adding to the dyestuff molecule, carrying an OH-group, ethylene oxide (for making it hydrophilic) or higher epoxides (for making it hydrophobic), this being done via a hemiformal group.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

The following examples are divided into three groups:
(A) Production of the pure hemiformals according to the new and novel process herein.
(B) Reaction of the hemiformals from Group A with epoxides in the presence of an electrophilic catalyst.
(C) Further reaction (alkaline hydroxethylation) of the asymmetrical formals from Group B.

(A) Production of the hemiformals

The hemiformals are produced in accordance with the process shown in FIGURE 1. There is provided a three-necked reactor 1 having a gas inlet line 3, stirrer 5, thermometer 7, and a gas discharge line 9 leading via a pressure release tank 11 containing mercury ($Q_1$) to the exhaust flue 13. The pure alcohol to be reacted is charged into the reactor 1 whose size is chosen such that it is two-thirds full after the reaction is completed. The gas inlet line 3 extending below the surface of the alcohol in the reactor, is connected via a holding tank 15 connected to a pressure release tank 17 containing mercury ($Q_2$) and a nitrogen pipeline to a storage vessel 21 containing liquid, monomeric formaldehyde. The height of the mercury $Q_2$ in the tank 17 above the gas inlet is adjusted such that the gas stream will bubble through the mercury and pass out line 23 only in case the gas discharge line 9 is blocked. The incoming nitrogen is first passed through a drying tower 25. After the tanks and pipelines have been well purged with the dry nitrogen, the vessel containing the liquid formaldehyde is uniformly heated to distill the formaldehyde and cause the same to flow into the well stirred (ca. 550 rotations per minute) alcohol at the same rate it is being reacted. The alcohol is, if desired, heated, before the beginning of the reaction, to a predetermined temperature which is thereafter maintained during the reaction by cooling. The formaldehyde vaporization rate is selected to provide, after the bulk of nitrogen has been displaced in the system, a slight vacuum throughout the entire system. After adding to the alcohol an equivalent amount of formaldehyde, the reaction is terminated. Table 1 shows the individual experimental data obtained by the procedure and the analytical findings therefrom, this table being appended hereto.

In the same manner, it is possible, for example, to react:

In Example A1: Glycol, propanediol, glycerin, butanediol-(1,4), 3-chloropropanediol-(1,2), etc.

In Example A2: 3-methylpentanol-(2), 5-methylhexanol-(2), 5-methyl-heptanol-(2), 2-methylnonanol-(2), 5-ethylheptanol-(2), 2,7-dimethyldecanol-(4), 2-methyl-7-ethyl-nonanol-(4).

In Example A3: p-Chlorobenzyl alcohol, o-methoxybenzyl alcohol, 3-phenyl-propanol-(1).

In Example A4: Decyl alcohol, cetyl alcohol, ceryl alcohol.

In Example A5: tert.-Amyl alcohol, acetone cyanhydrin, 2-phenylpropanol-(2).

In Example A6: $\Delta^3$-butenol-(1), propargyl alcohol, chlorohydrin, allyl alcohol, 4-hydroxymethyl dioxolane-(1,3), N,N-dimethyl glycolic acid amide, monomethyl glycol ether.

In Example A7: o-Allyl phenol, p-nonyl phenol, p-chlorophenol, o-cresol.

In Example A8: Methanol, ethanol, propanol, pentanol, octanol.

In Example A9: Other technical mixtures of higher primary alcohols.

In Example A10: Cyclopentanol, cyclohexanol, cycloheptanol, 4-dodecylhexanol-(1).

The hemiformals produced by this process are suitable for the reaction with epoxides without any additional process steps or purifying operations.

Figure 2:
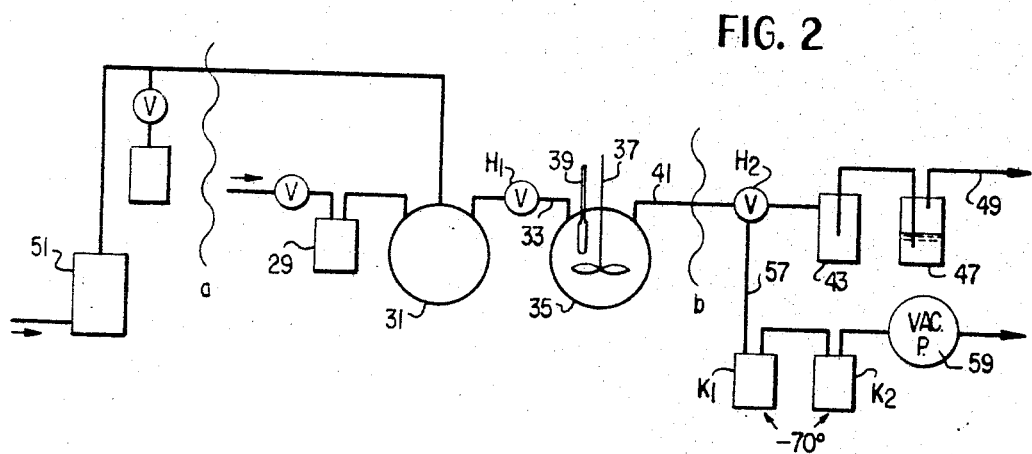
FIGURE 2 is a schematic diagram of the process used in producing asymmetrical formals by the reaction of hemiformals with gaseous epoxides.

(B) Reaction of the hemiformals with epoxides in the presence of electrophilic catalysts The reactions of the hemiformals with gaseous epoxides are conducted in an apparatus similar to that used for producing the hemiformals. Only the following alterations are made as illustrated in FIGURE 2.

The storage vessel for liquid, monomeric formaldehyde is replaced by a storage vessel 29 containing liquid epoxide. Furthermore, a cock valve ($H_1$) is inserted between the holding tank 31 and the gas inlet line 33 to the reactor. The reactor, shown generally at 35, contains a stirrer 37, thermometer 39 and a gas discharge line 41 which extends across a three-way valve ($H_2$) and a pressure release tank 43 into a washing vessel 47 charged with dilute (about 0.5 N) KOH, and from there into the exhaust flue 49. The pressure relief tanks in this apparatus have been omitted.

Figure 3:
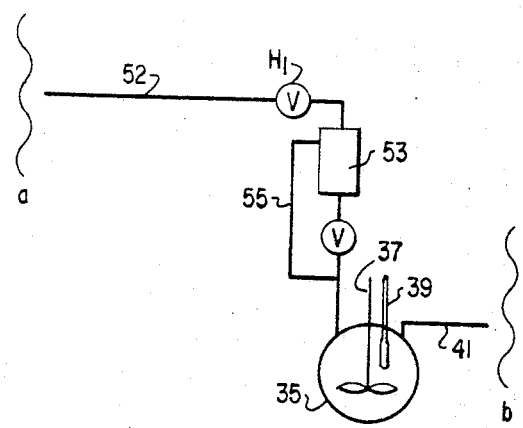
FIGURE 3 is a partial section of the schematic diagram of FIGURE 2 illustrating the modification of the latter when liquid epoxides are used in place of gaseous epoxides.

The hemiformal is introduced into reactor 35 and the catalyst is then admixed therewith. After the entire apparatus has been purged with dry nitrogen from drying tower 51 and effluent line 52, the liquid epoxide is heated and the generated epoxide vapors are passed to the reactor. When pure liquid epoxides, or epoxides dissolved in inert solvents are passed into the reactor the gas inlet line 33, the holding tank 31, and the storage vessel 29 containing the liquid epoxide are omitted, as shown in FIGURE 3, and replaced by a gravity flow funnel 53 which is connected to the reactor having a gas by-pass line 55 for pressure equalization. The liquid epoxide, or the epoxide solution are introduced directly into the funnel 53 and nitrogen line 52 is connected to the top of funnel 53 so that the apparatus can be purged with dry nitrogen via the by-pass line 55.

After the main quantity of the nitrogen has been displaced, the epoxide vaporization rate is regulated whereby to obtain a pressure slightly below atmospheric throughout the system. As the reaction is initiated, the temperature increases rapidly and it is thereafter necessary to cool the reaction mass to maintain the temperature thereof at an acceptable level. The reaction mass is stirred after adding the epoxide until the temperature drops, and the subatmospheric pressure created thereby is compensated for by the introduction of dry nitrogen into the system. The highly volatile reaction products can be removed from the reaction mass by the application of a vacuum thereto. For this purpose, $H_1$ is closed and $H_2$ is opened, thereby connecting the discharge gas line 57 across cooling trap or condenser $K_1$, and a second cooling trap $K_2$ to a vacuum pump 59.

$K_1$ and $K_2$ are both cooled with Dry Ice-methanol to −70° C. After the pressure is reduced to 10 to 15 mm. Hg, the volatile components of the reaction mass are removed at a temperature of about 60 to 80° C. and condensed in $K_1$. After the system pressure is elevated by the introduction of nitrogen via the opened valve $H_1$, the catalyst is neutralized. The latter neutralization can be performed before the volatile components are removed, which would be the case when either the base is added in solid form and is non-volatile, or else, the volatile components of the reaction mixture are not to be isolated. After the neutralizing step, in the event the base was added in a solution, the solvent therefor is removed by repeating the above-mentioned manipulation.

In Table 2, appended hereto, the experimental data and the analytical findings are set forth for the individual examples. The PG-values were determined by an extraction method (Z. Analytische Chemi 196, 22 (1963)), using butanol instead of methyl ethyl ketone. The MG-values were found ebullioscopically and via the OH-number.

(C) Alkali-catalyzed hydroxethylation of the reaction products of Group B

The reaction is conducted in an apparatus as described for the examples of Group B. The reaction products obtained by the process described in (B) above are substantially freed from polyglycol in admixture therewith by dissolving the same in hexane. The heavy hexane phase is then separated and the hexane is removed therefrom under vacuum distillation at 60° C.

After the catalyst is added to the reaction product and the apparatus is purged with dry nitrogen, the contents of the reaction flask are heated to about 180° C. The nitrogen in the system is then displaced by predetermined quantities of ethylene oxide. At the beginning of the reaction the temperature of the water bath surrounding the reactor is maintained at about 25 to 50° C. below the reaction temperature for cooling purposes. Removal of volatile reaction products and neutralization of the catalyst are omitted.

In Table 3, appended hereto, the individual experimental data and the analytical findings are disclosed.

The ethylene oxide can be replaced, in all cases, by propylene oxide.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

TABLE 1.—PREPARATION OF THE HEMIFORMALS

| Ex. No. | Alcohol | Mol. Alcohol | Temp. (°C) | Time (Min.) | $n_D^{20}$ | $D_4^{20}$ | | C | H | O | MW |
|---|---|---|---|---|---|---|---|---|---|---|---|
| A1 | Butanediol-(1,4) | 3.5 | 55 | 85 | 1.4470 | 1.1187 | Calculated for___ | 47.98 | 9.40 | 42.62 | 150.17 |
| | | | | | | | $C_6H_{14}O_4$ found__ | 47.84 | 9.33 | 42.85 | 166 |
| A2 | Techn. mixture of sec. n-$C_{14}$-alcohol | 3 | 85 | 40 | -------- | 0.8805 | Calculated for___ | 73.71 | 13.20 | 13.09 | 244.41 |
| | | | | | | | $C_{15}H_{32}O_2$ found__ | 73.43 | 12.95 | 13.34 | 247 |
| A3 | Benzyl alcohol | 4 | 50 | 55 | 1.5204 | 1.0982 | Calculated for___ | 69.54 | 7.30 | 23.16 | 138.16 |
| | | | | | | | $C_8H_{10}O_2$ found__ | 68.97 | 7.35 | 23.66 | 147 |
| A4 | Lauryl alcohol | 6 | 75 | 50 | -------- | 0.8784 | Calculated for___ | 72.16 | 13.05 | 14.79 | 216.36 |
| | | | | | | | $C_{13}H_{28}O_2$ found__ | 71.88 | 13.11 | 14.97 | 216 |
| A5 | tert. Butanol | 5 | 55 | 210 | 1.4025 | 0.8914 | Calculated for___ | 57.66 | 11.61 | 30.73 | 104.15 |
| | | | | | | | $C_5H_{12}O_2$ found__ | 57.41 | 11.69 | 30.98 | 111 |
| A6 | Propyleneglycol monoacrylate | 5 | 15 | 100 | -------- | 1.1097 | Calculated for___ | 52.49 | 7.55 | 39.96 | 160.17 |
| | | | | | | | $C_7H_{12}O_4$ found__ | 52.02 | 7.66 | 40.59 | 164 |
| A7 | Phenol | 2 | 120 | 120 | 1.5298 | 1.1347 | Calculated for___ | 67.63 | 6.50 | 25.78 | 164 |
| | | | | | | | $C_7H_8O_2$ found___ | 67.35 | 6.50 | 26.37 | 124 |
| A8 | n-Butanol-(1) | 5 | 70 | 90 | -------- | 0.9184 | Calculated for___ | 57.66 | 11.61 | 30.73 | 104.15 |
| | | | | | | | $C_5H_{12}O_2$ found__ | 57.25 | 11.48 | 31.05 | 111 |
| A9 | Techn. mixture prim. n-$C_{10}$-$C_{18}$-alcohols | 6 | 75 | 90 | -------- | 0.8835 | Calculated for_____ | | | | [1] 234 |
| | | | | | | | Found_____ | 73.06 | 13.00 | 14.08 | 254 |
| A10 | Cyclododecanol | 3 | 70 | 80 | -------- | -------- | Calculated for___ | 72.84 | 12.23 | 14.93 | 214.34 |
| | | | | | | | $C_{13}H_{26}O_2$ found__ | 72.48 | 12.20 | 15.41 | 216 |

[1] The molecular weight was calculated from the equivalent weight of the starting material determined via the OH-number.

TABLE 2.—REACTION OF HEMIFORMALS WITH EPOXIDES

| Ex. No. | Hemiacetal from Example No. | Mol | Catalyst | Quantity, ml. | Epoxide | Equiv.[1] | Temp., °C. | Time, hrs. | Volatile | PG,[2] percent | MW[1] | MW, OH[3] | MW[4] |
|---|---|---|---|---|---|---|---|---|---|---|---|---|---|
| B1 | A2 | ½ | SnCl₄ | 1 | Ethylene oxide | 4.3 | 40 | 70 min | 3 g. dioxane | 6.8 | 434 | 425 | 430 |
| B2 | A2 | ½ | SnCl₄ | 0.5 | do | 5.5 | 45 | 7½ | | 7.7 | 484 | 479 | 460 |
| B3 | A2 | ½ | BF₃-etherate | 0.15 | do | 1.25 | 60 | 3 | 1 g. dioxane | 10.3 | 436 | 444 | 420 |
| B4 | A2 | ½ | do | 0.1 | do | 3.3 | 40 | 2 | | 8.0 | 390 | 397 | 390 |
| B5 | A2 | ½ | BF₃-etherate 2× | 0.1 | do | 4.8 | 30 | 5 | Trace of dioxane | 10.5 | 456 | 489 | |
| B6 | A2 | ½ | do | 0.2 | do | 6.3 | 50 | 1¾ | do | 13.4 | 520 | 500 | |
| B7 | A9 | ½ | do | 0.5 | do | 7.7 | 40 | 130 min | 8 g. dioxane | 18.0 | 574 | 591 | 500 |
| B8 | A2 | ½ | SnCl₄ | 0.8 | do | 7.9 | 40 | 6 | 15 g. dioxane | 7.7 | 592 | 594 | 580 |
| B9 | A2 | ½ | SnCl₄ | 0.5 | do | 2.0 | 40 | 2 | 0.2 g. dioxane | 2.4 | 332 | 337 | 350 |
| B10 | A2 | ½ | (1) SnCl₄ / (2) BF₃-etherate | 0.3 / 0.2 | do | 1.2 | 35 | 35 min | 2.3 g. dioxane | 8.6 | 372 | 385 | 365 |
| B11 | A4 | ½ | BF₃-etherate | 0.3 | do | 1.7 | 70 | 1¼ | | | | | |
| B12 | A1 | ⅔ | do | 0.9 | do | 1.4 | 35 | 1 | 2 g. dioxane | 1.3 | 279 | 292 | 271 |
| B13 | A1 | 1 | do | 0.3 | Propylene oxide | 2.6 | 40 | 5 | 10 g. | | 302 | 316 | |
| B14 | A1 | 1 | do | 2.5 | Ethylene oxide | 5.3 | 40 | 4 | 19 g. dioxane | | 384 | 380 | |
| B15 | A3 | ½ | do | 0.5 | Propylene oxide | 9.1 | 40 | 6½ | 43 g. | | 676 | 702 | |
| B16 | A3 | 1 | do | 0.3 | Cyclohexene oxide | 1.4 | 40 | 140 min | 2 g. | | 276 | 301 | |
| B17 | A5 | 1 | do | 0.3 | Ethylene oxide | 2.7 | 40 | 2 | 11 g. dioxane | | 255 | 280 | 230 |
| B18 | A7 | 1 | do | 0.2 | do | 1.5 | 40 | 140 min | 3 g. dioxane | | 169 | 175 | 205 |
| B19 | A8 | 1 | do | [5]0.3 | Propylene oxide | 1.3 | 40 | 1 | | | 200 | 221 | |
| B20 | A6 | 0.62 | do | 0.3 | do | 2.1 | 40 | 1½ | | | 225 | 220 | 236 |
| B21 | A10 | ½ | do | 0.4 | Ethylene oxide | 4.6 | 40 | 2¾ | | | 452 | | 410 |
| B22 | A2 | ½ | do | 0.4 / 1.0 | do / Propylene oxide | 6.0 / 3.1 | 40 / 40 | 2 / 2½ | 17 g. | 14.7 | 476 / 422 | 533 / 436 | [6]440 / 410 |

[1] Calculated from the weight increase after removing the volatile proportions.
[2] Percentage of polyglycol found.
[3] Molecular weight, determined via the OH-number.
[4] Molecular weight, determined ebullioscopically.
[5] In this case, the above-disclosed general rule was altered. In order to prevent the condensation of the phenol semiformals by Lewis acids, which was to be expected, the hemiformal was mixed with the propylene oxide, and then the catalyst (diluted with benzene 1:20) was added so slowly that the temperature could be maintained at 40 °C. by water cooling.
[6] Point of turbidity (2% in water)—48° C. Wetting value (1 g./l.; 22° C.)—120 seconds.

TABLE 3

| Ex. No. | Product employed from Example | Mol | Catalyst | Quantity (Parts by Weight) | Equivalents Ethylene oxide | Temp., °C. | Time, hrs. | PG | MW | MW, OH | Soluble | |
|---|---|---|---|---|---|---|---|---|---|---|---|---|
| C1 | B10 | ½ | KOH | 1.4 | 5.8 | 185 | 1¼ | 7.2 | 628 | 659 | Water or benzene | Chloroform. |
| C2 | B11 | ½ | KOH | 1.4 | 4.4 | 195 | 1½ | 8.8 | 475 | 523 | do | Do. |
| C3 | B2 | ⅓ | KOH | 1.0 | 6.7 | 185 | 1¼ | 13.0 | 780 | 785 | do | Do. |
| C4 | B11 | ½ | Na | 0.5 | 6.8 | 190 | 100 Min | 12.8 | 570 | 583 | do | Do.[1] |
| C5 | B1 | ⅓ | Na | 1.0 | 4.8 | 185 | 30 Min | 6.9 | 645 | 680 | do | Do.[2] |

[1,2] See table below:

| | 1 | 2 |
|---|---|---|
| Point of turbidity (2% in water), °C | 51 | 58 |
| Wetting number (1 g./l.; 22° C.), seconds | 25 | 29 |

NOTE.—The products produced according to Examples C4 and C5 are eminently suitable as detergents.

What is claimed is:

1. A process for the production of asymmetrical formals, which process comprises reacting a substantially pure hemiformal selected from the group consisting of a hemiformal of an alcohol selected from the group consisting of diethylene glycol monoethyl ether, triethylene glycol monoethyl ether, triethylene glycol monobutyl ether, 1,2-propylene glycol-1-n butyl ether and ethylene glycol monomethyl ether and a hemiformal of the formula R—(O—CH₂—OH)ₘ with an epoxide at 0–120° C. in the presence of a Lewis acid catalyst having a concentration of about 0.0005–7% by weight of the hemiformal;
   said epoxide being selected from the group consisting of ethylene oxide, propylene oxide, butylene oxide, cyclohexene oxide, epichlorohydrin, cyclooctene oxide, a butene oxide, butadiene monoxide, styrene oxide, α-methyl styrene oxide, and cyclohexyl ethylene oxide; and
   wherein R is a radical having a valence of 1–4 selected from the group consisting of saturated aliphatic hydrocarbon of 1–200 carbon atoms, acyclic hydrocarbons of 4–20 carbon atoms in the ring and having 0–5 side chains having 1–8 carbon atoms; aliphatic hydrocarbon having 3 to 40 carbon atoms and having no more than 10 double or triple bonds, hydrocarbon aryl of 1–3 rings; and hydrocarbon aralkyl having in the alkyl portion 1–20 carbon atoms and in the aryl portion 1–3 rings; and
   m is an integer of 1–4.

2. A process as defined by claim 1 wherein R is alkyl of 1–25 carbon atoms, and m is an integer of 1–4.

3. A process as defined by claim 1 wherein said hemiformal is a hemiformal of an alcohol selected from the group consisting of methanol, ethanol, n-propanol, n-butanol, isobutyl alcohol, n-amyl alcohol, isoamyl alcohol, n-hexyl alcohol, n-heptanol, n-octyl alcohol, n-decyl alcohol, lauryl alcohol, myristyl alcohol, cetyl alcohol, stearyl alcohol, benzyl alcohol, cyclohexanol, isopropanol, sec. butyl alcohol, sec. amyl alcohol, 6-ethyl-decanol-(3), 5-ethyl-heptanol-(2), 5-ethyl-nonanol-(2), 6-ethyl-octanol-(3), and tert. butanol.

4. The process of claim 1 wherein the Lewis acid catalyst is employed in quantities of 0.5 to 5.0% by weight of the hemiformal.

5. The process of claim 1 wherein the reaction is conducted at a temperature of 20 to 70° C.

6. The process of claim 1 wherein the reaction is conducted at a velocity of at least 0.1 to 3.5 mols of epoxide per mol of hemiformal consumed per hour.

7. The process of claim 1 wherein there is employed 1 to 40 mols of epoxide per mol of the hemiformal.

8. The process of claim 1 wherein the reaction is conducted in an inert solvent.

9. The process of claim 1 wherein the epoxide is ethylene oxide.

10. The process of claim 1 wherein the Lewis acid catalyst is selected from the group consisting of boron fluoride-etherate and tin tetrachloride.

11. A process according to claim 1 further characterized in that the asymmetrical formals are reacted with further epoxide in the presence of an alkaline catalyst selected from the group consisting of an alkali metal and an alkali metal hydroxide at a temperature of 110 to 250° C.

12. The process of claim 1 wherein further epoxide addition is conducted in the presence of 0.1 to 2.5% by weight of catalyst at a temperature of 140 to 200° C.

References Cited

UNITED STATES PATENTS

| | | | |
|---|---|---|---|
| 2,395,265 | 2/1946 | Gresham | 260—340.9 |
| 2,796,423 | 6/1957 | Cottle et al. | |
| 2,327,053 | 8/1943 | Marple et al. | 260—611 |
| 2,657,241 | 10/1953 | Mast et al. | 260—611 |
| 2,796,401 | 6/1957 | Matuszak et al. | |
| 2,848,500 | 8/1958 | Funck | 260—611 XR |
| 2,870,220 | 1/1959 | Carter. | |

OTHER REFERENCES

Walker: "Formaldehyde," Reinhold Publishing Corp., New York (1953), pp. 61–63, 236, OD305, A6W3 (1953).

Reychler: Soc. Chim. de France, Bulletin (1907) (4), pp. 1189–1195, OD154.

LEON ZITVER, *Primary Examiner.*

HOWARD T. MARS, *Assistant Examiner.*

U.S. Cl. X.R.

260—332.1, 340.9, 465.6, 484, 485, 486, 491, 561, 592, 609, 613, 615